(12) United States Patent
Langlois et al.

(10) Patent No.: US 11,589,034 B2
(45) Date of Patent: Feb. 21, 2023

(54) METHOD AND APPARATUS FOR PROVIDING INFORMATION TO A USER OBSERVING A MULTI VIEW CONTENT

(71) Applicant: Interdigital Madison Patent Holdings, SAS, Paris (FR)

(72) Inventors: Tristan Langlois, Cesson-Sevigne (FR); Paul Kerbiriou, Thorigné-Fouillard (FR); Valerie Allie, Cesson-Sevigne (FR)

(73) Assignee: Interdigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/620,567

(22) PCT Filed: Jun. 1, 2018

(86) PCT No.: PCT/EP2018/064510
§ 371 (c)(1),
(2) Date: Dec. 9, 2019

(87) PCT Pub. No.: WO2018/228833
PCT Pub. Date: Dec. 20, 2018

(65) Prior Publication Data
US 2020/0195914 A1    Jun. 18, 2020

(30) Foreign Application Priority Data

Jun. 12, 2017 (EP) .................................. 17305712

(51) Int. Cl.
*H04N 7/18*        (2006.01)
*H04N 13/383*      (2018.01)
(Continued)

(52) U.S. Cl.
CPC ........... *H04N 13/383* (2018.05); *H04N 13/31* (2018.05); *H04N 13/344* (2018.05)

(58) Field of Classification Search
CPC .... H04N 13/383; H04N 13/344; H04N 13/31; H04N 13/398
(Continued)

(56) References Cited

U.S. PATENT DOCUMENTS

| 5,900,849 A | 5/1999 | Gallery |
| 6,097,394 A | 8/2000 | Levoy |

(Continued)

FOREIGN PATENT DOCUMENTS

| CN | 101301857 A | 11/2008 |
| CN | 102117180 A | 7/2011 |

(Continued)

OTHER PUBLICATIONS

Dodgson, Neil A., "Analysis of the viewing zone of multi-view autostereoscopic displays", Proceedings of SPIE, vol. 4660, May 2002, pp. 254-265.

(Continued)

*Primary Examiner* — Alison Slater
(74) *Attorney, Agent, or Firm* — Smadar Gefen

(57) ABSTRACT

Some embodiments of a method may include defining a triggering area, the triggering area having a border with the border being arranged, at least partially, within a positioning zone for observing a multi view content displayed on a display based on a position of a viewer; and when the viewer position is located within the triggering area, triggering one or more incentive effects. Some embodiments of an apparatus may include a processor; and a memory-storing device storing instructions operative, when executed by the processor, to cause the apparatus to: define a triggering area, the triggering area having a border with the border being arranged, at least partially, within a positioning zone for observing a multi view content displayed on a display based on a position of a viewer; and when the viewer position is (Continued)

located within the triggering area, trigger one or more incentive effects.

24 Claims, 8 Drawing Sheets

(51) Int. Cl.
  *H04N 13/344* (2018.01)
  *H04N 13/31* (2018.01)
(58) Field of Classification Search
  USPC .................................................. 348/48
  See application file for complete search history.

(56) References Cited

U.S. PATENT DOCUMENTS

| | | |
|---|---|---|
| 7,792,423 B2 | 9/2010 | Raskar |
| 8,416,289 B2 | 4/2013 | Akeley |
| 8,803,918 B2 | 8/2014 | Georgiev |
| 8,823,771 B2 | 9/2014 | Jeong |
| 8,933,862 B2 | 1/2015 | Lapstun |
| 8,995,785 B2 | 3/2015 | Knight |
| 9,060,093 B2 | 6/2015 | Chu |
| 9,098,112 B2 | 8/2015 | Cheng |
| 9,132,352 B1 | 9/2015 | Rabin |
| 9,214,013 B2 | 12/2015 | Venkataraman |
| 9,299,183 B2 * | 3/2016 | Vesely ................ H04N 13/383 |
| 9,451,924 B2 | 9/2016 | Bernard |
| 9,520,106 B2 | 12/2016 | An |
| 10,033,986 B2 | 7/2018 | Pitts |
| 10,104,370 B2 | 10/2018 | Fusama |
| 10,116,867 B2 | 10/2018 | Blonde |
| 10,182,183 B2 | 1/2019 | Sabater |
| 10,313,633 B2 | 6/2019 | Rosenberg |
| 10,390,005 B2 | 8/2019 | Nisenzon |
| 10,444,931 B2 | 10/2019 | Akeley |
| 10,474,227 B2 | 11/2019 | Carothers |
| 10,540,818 B2 | 1/2020 | Akeley |
| 10,545,215 B2 | 1/2020 | Karafin |
| 10,679,361 B2 | 6/2020 | Karnad |
| 10,679,373 B2 | 6/2020 | Riemens |
| 10,852,838 B2 | 12/2020 | Bradski |
| 2004/0075735 A1 | 4/2004 | Marmaropoulos |
| 2004/0156631 A1* | 8/2004 | Redert ...................... G06T 17/00 398/25 |
| 2005/0123171 A1 | 6/2005 | Kobayashi |
| 2007/0285554 A1 | 12/2007 | Givon |
| 2008/0088935 A1* | 4/2008 | Daly ................... H04N 13/359 348/E13.043 |
| 2010/0091092 A1 | 4/2010 | Jeong |
| 2011/0102423 A1* | 5/2011 | Nam ..................... H04N 13/371 345/419 |
| 2011/0157154 A1 | 6/2011 | Bernard |
| 2011/0254926 A1* | 10/2011 | Ushiki ................ H04N 13/178 348/46 |
| 2011/0273466 A1 | 11/2011 | Imai |
| 2011/0316987 A1* | 12/2011 | Komoriya ............ H04N 13/351 348/51 |
| 2012/0182299 A1 | 7/2012 | Bowles |
| 2013/0044103 A1* | 2/2013 | Lee ....................... H04N 13/383 345/419 |
| 2013/0050412 A1* | 2/2013 | Shinohara ............ H04N 13/128 348/42 |
| 2013/0093752 A1 | 4/2013 | Yuan |
| 2013/0278719 A1 | 10/2013 | Rusert |
| 2014/0028662 A1 | 1/2014 | Liao |
| 2014/0036046 A1 | 2/2014 | Takefumi |
| 2014/0066178 A1* | 3/2014 | Kelly .................. G07F 17/3211 463/33 |
| 2014/0146148 A1 | 5/2014 | Maciocci |
| 2014/0306963 A1 | 10/2014 | Sun |
| 2015/0042557 A1* | 2/2015 | Narita ................ G06F 3/04815 345/156 |
| 2015/0156470 A1* | 6/2015 | Didyk .................. H04N 13/122 348/51 |
| 2015/0189261 A1 | 7/2015 | Kaneko |
| 2015/0215600 A1 | 7/2015 | Norkin |
| 2015/0235408 A1 | 8/2015 | Gross |
| 2015/0334369 A1 | 11/2015 | Bruls |
| 2015/0362743 A1 | 12/2015 | Lanman |
| 2016/0029012 A1 | 1/2016 | Bruls |
| 2016/0201776 A1 | 7/2016 | Takase |
| 2016/0214016 A1 | 7/2016 | Stafford |
| 2016/0234481 A1* | 8/2016 | Borel .................. H04N 13/305 |
| 2016/0284048 A1 | 9/2016 | Rekimoto |
| 2016/0309081 A1 | 10/2016 | Frahm |
| 2017/0003507 A1 | 1/2017 | Raval |
| 2017/0085867 A1* | 3/2017 | Baran ..................... B41M 3/008 |
| 2017/0091983 A1 | 3/2017 | Sebastian |
| 2017/0148186 A1 | 5/2017 | Holzer |
| 2017/0188002 A1 | 6/2017 | Chan |
| 2017/0243373 A1 | 8/2017 | Bevensee |
| 2017/0280126 A1* | 9/2017 | Van der Auwera ... G06T 3/0056 |
| 2018/0020204 A1 | 1/2018 | Pang |
| 2018/0046874 A1 | 2/2018 | Guo |
| 2018/0097867 A1 | 4/2018 | Pang |
| 2018/0253884 A1 | 9/2018 | Burnett, III |
| 2019/0054734 A1* | 2/2019 | Baran ....................... B41F 5/24 |
| 2019/0236796 A1 | 8/2019 | Blasco Claret |
| 2019/0385323 A1 | 12/2019 | Doyen |
| 2020/0059635 A1 | 2/2020 | Katsumata |
| 2020/0074658 A1 | 3/2020 | Yu |
| 2020/0134849 A1 | 4/2020 | Blasco Claret |
| 2020/0410635 A1 | 12/2020 | Varanasi |
| 2021/0103148 A1 | 4/2021 | Hua |

FOREIGN PATENT DOCUMENTS

| | | |
|---|---|---|
| CN | 103209313 A | 7/2013 |
| CN | 104145234 A | 11/2014 |
| CN | 103281550 B | 3/2015 |
| CN | 104798370 A | 7/2015 |
| CN | 105488771 A | 4/2016 |
| CN | 106210465 A | 12/2016 |
| CN | 106210538 A | 12/2016 |
| CN | 106501635 A | 3/2017 |
| EP | 2863635 A1 | 4/2015 |
| EP | 3099055 A1 | 11/2016 |
| GB | 2488905 A | 9/2012 |
| JP | H10504917 A | 5/1998 |
| JP | 2005165848 A | 6/2005 |
| JP | 2016541035 A | 12/2016 |
| JP | 6113337 B | 4/2017 |
| RU | 2423018 C2 | 6/2011 |
| RU | 2014150963 A | 3/2017 |
| WO | 2013132886 A | 9/2013 |
| WO | 2013180192 A1 | 12/2013 |
| WO | 2014149403 A1 | 9/2014 |
| WO | 2015122108 A1 | 8/2015 |
| WO | WO2018228918 A1 | 12/2018 |

OTHER PUBLICATIONS

Dodgson, N. A., "Analysis of the viewing zone of the Cambridge autostereoscopic display", Applied Optics, vol. 35, No. 10, Apr. 1, 1996, pp. 1705-1710.

Geng, Wenjing, et. al. "Flat3D: Browsing Stereo Images on a Conventional Screen" International Conference on Multimedia Modeling, (2015), pp. 546-558.

Feldmann, Ingo, et. al., "Navigation Dependent Nonlinear Depth Scaling". Proceedings of 23rd International Picture Coding Symposium, Apr. 23-25, 2003, 4 pages.

Buchanan, P., et. al., "Creating a View Dependent Rendering System For Mainstream Use". IEEE 23rd International Conference Image and Vision Computing, (2008), 6 pages.

Řeřabek, Martin, et. al., "Motion Parallax Based Restitution of 3D Images on Legacy Consumer Mobile Devices". IEEE 13th International Workshop on Multimedia Signal Processing, (2011), 5 pages.

(56) References Cited

OTHER PUBLICATIONS

Hoang, Anh Nguyen, et. al., "A Virtual Reality System Using View-Dependent Stereoscopic Rendering". IEEE International Conference on Information Science & Applications (ICISA), (2014), 4 pages.

Angco, Marc Jordan G., et. al., "Depth Perception Through Adaptive 3D View Perspective and Motion Parallax". IEEE Asia Pacific Conference on Wireless and Mobile, (2015), pp. 83-88.

Levin, Anat, et. al., "Understanding Camera Trade-Offs Through A Bayesian Analysis Of Light Field Projections". Proceedings of European Conference on Computer Vision, (2008), pp. 1-14.

Ng, Ren, et. al., "Digital Light Field Photography". A Dissertation Submitted to the Department of Computer Science and the Committee on Graduate Studies of Stanford University, Jul. 2006, 203 pages.

Wanner, Sven, et. al., "Generating EPI Representation of a 4D Light Fields with a Single Lens Focused Plenoptic Camera". International Symposium on Visual Computing (ISVC), (2011), pp. 90-101.

Merkle, Philipp, et. al., "Efficient Prediction Structures for Multiview Video Coding" IEEE Transactions on Circuits and Systems For Video Technology, vol. 17, No. 11, Nov. 2007, pp. 1461-1473.

Hirsch, Matthew, et. al., "A Compressive Light Field Projection System". ACM Transactions on Graphics vol. 33, No. 4, (2014), 20 pages.

Muddala, Suryanarayana, et. al., "Depth-Included Curvature Inpainting for Disocclusion Filing in View Synthesis". International Journal on Advances in Telecommunications, vol. 6 No. 3 & 4, (2013), pp. 132-142.

Fehn, Christoph, et. al., "Key Technologies for an Advanced 3D-TV System". Three-Dimensional TV, Video, and Display III, Proceedings of SPIE, vol. 5599, (2004), pp. 66-80.

International Search Report and Written Opinion of the International Searching Authority for PCT/EP2018/065033, dated Sep. 20, 2018.

International Preliminary Report on Patentability for PCT/EP2018/065033 dated Dec. 17, 2019, 6 pages.

Shreiner, Dave, et. al., "Homogeneous Coordinates and Transformation Matrices". OpenGL Programming Guide 8th edition, Appendix E, Mar. 2013, pp. 829-834.

International Search Report and Written Opinion of the International Searching Authority for PCT/EP2018/064510 dated Aug. 13, 2018, 11 pages.

International Preliminary Report on Patentability for PCT/EP2018/064510 dated Dec. 17, 2019, 8 pages.

\* cited by examiner

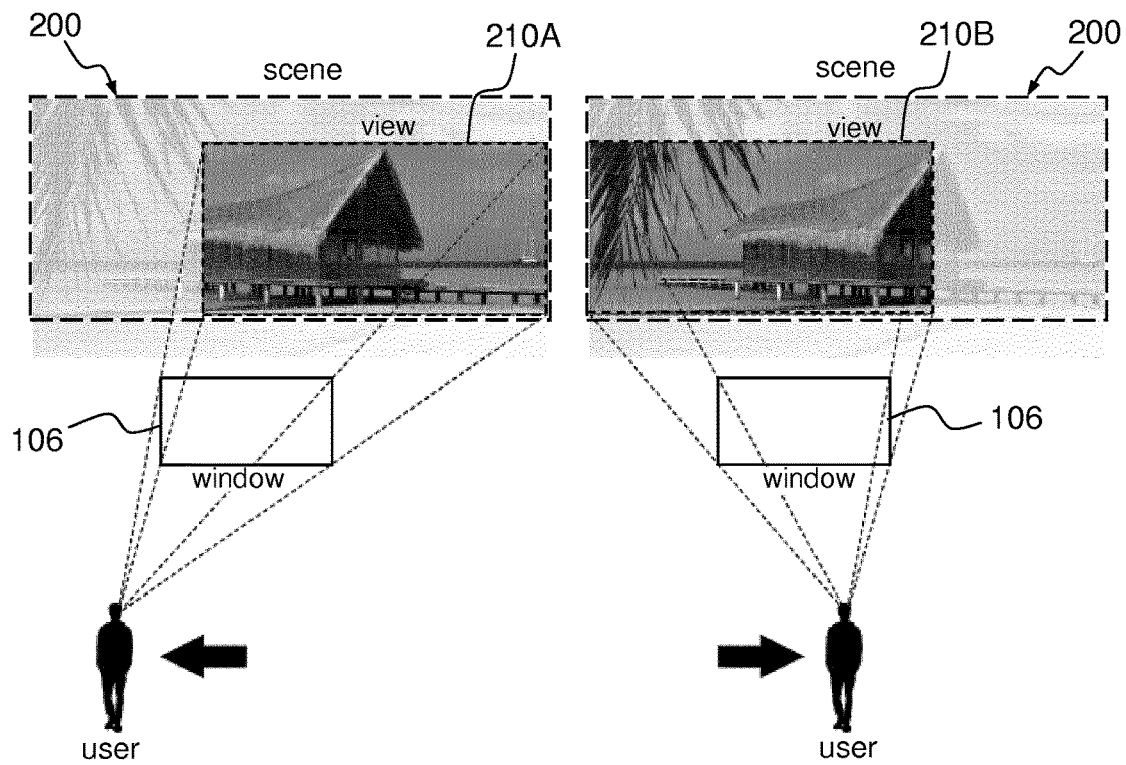
FIG.2A  FIG.2B
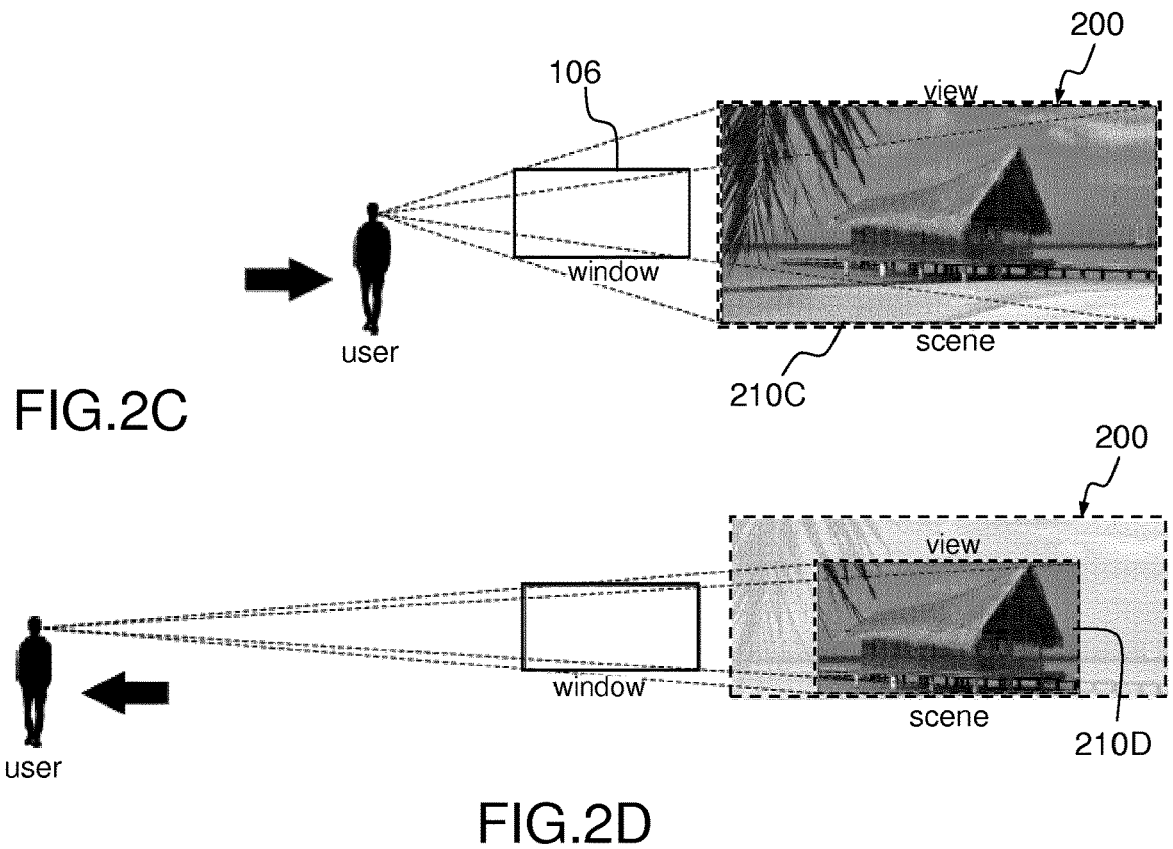
FIG.2C
FIG.2D

METHOD AND APPARATUS FOR PROVIDING INFORMATION TO A USER OBSERVING A MULTI VIEW CONTENT

This application claims the benefit, under 35 U.S.C. § 365 of International Application PCT/EP2018/064510, filed Jun. 1, 2018, which was published in accordance with PCT Article 21(2) on Dec. 20, 2018, in English, and which claims the benefit of European Patent Application No. 17305712.6 filed Jun. 12, 2017.

TECHNICAL FIELD

The present disclosure relates to the rendering of a multi view content. Particularly, but not exclusively, the present disclosure is directed to the rendering of a multi view multimedia content on a display screen depending on user's position.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A multi view content (so called Light Field content), still image or video, can be obtained by Light Field acquisition system, such as a fixed camera array composed of a plurality of distinct cameras or a plenoptic camera formed by an array of micro-lenses placed in front of an image sensor. For each frame of a Light Field video or each Light Field image, the Light Field acquisition system is able to provide a set of multi-views, a set of depth maps and associated system acquisition parameters.

When rendering a Light Field content on a known display screen (e.g. a 2D TV screen), a user can benefit from the parallax capability offered by the Light Field content, providing a parallax rendering effect and a Virtual Reality (VR) experience. The parallax effect gives a sense of depth and makes a user feel the volume of objects or characters of a scene.

Depending on the Light Field acquisition system and user's position (in particular his head or eyes), the scene coverage can have some limitations leading the user to perceive holes or black surfaces on the edges.

The present disclosure has been devised with the foregoing in mind.

SUMMARY

In a general form, the disclosure concerns a method configured to be associated with the display of a multi view content on a display screen depending on a position of a user's head, wherein said method comprises:
- generating a positioning zone to observe the displayed multi view content;
- defining a triggering area arranged, at least partially, within the positioning zone;
- when the user's head position is located within said triggering area, triggering one or more incentive effects to encourage the user to stay within the positioning zone.

In an embodiment, the positioning zone and the triggering area can have both a pyramidal shape.

In an embodiment, the one or more incentive effects can comprise at least one of:
- a darkening effect to darken the display screen depending on the user's head position within said triggering area,
- a parallax intensity effect to adapt an intensity of a parallax effect associated with a user's head movement within the triggering area;
- one or more visual cues indicating a direction on the display screen.

In an embodiment, the darkening effect can increase when the angle of view associated with the user's head position located within the triggering area increases.

In an embodiment, the darkening effect can increase linearly with the angle of view of the user's head position.

In an embodiment, the parallax intensity effect can decrease the speed of movement of elements appearing in the multi view content displayed on the screen, when the angle of view associated with the user's head position located within the triggering area increases.

In an embodiment, the one or more incentive effects can be reversible.

In an embodiment, the multi view content having been acquired by an acquisition device, the positioning zone can be established based one or more obtained acquisition parameters of the acquisition device and one or more obtained parameters of the display screen.

In an embodiment, the pyramidal shape of the positioning zone can be defined by an horizontal angle of view of the acquisition device and a vertical angle of view of the acquisition device.

In an embodiment, the pyramidal shape can be centered with respect to the display screen.

In an embodiment, the positioning zone can be defined by a minimum distance from the display screen.

In an embodiment, said minimum distance from the display screen can correspond to the maximum distance between:
- an horizontal minimum distance obtained from a width of the display screen and an horizontal angle of view of the acquisition device,
- a vertical minimum distance obtained from a height of the display screen and a vertical angle of view of the acquisition device.

In an embodiment, the horizontal minimum distance can be obtained from the following equation:

$$z_{min} = \frac{w_{screen}}{2\tan^{-1}\left(\frac{\alpha}{2}\right)}$$

with $w_{screen}$ the width of the display screen, and $\alpha$ the horizontal angle of view of the acquisition device.

In an embodiment, wherein the vertical minimum distance can be obtained from the following equation:

$$z_{min} = \frac{h_{screen}}{2\tan^{-1}\left(\frac{\beta}{2}\right)}$$

with $h_{screen}$ the height of the display screen, and $\beta$ the vertical angle of view of the acquisition device.

In an embodiment, the positioning zone can be defined by a maximum distance from the display screen.

In an embodiment, said maximum distance can be obtained from a minimum height and a maximum height between which the user's gaze can be located.

In an embodiment, said maximum distance can be obtained from an intersection of the pyramidal shape and an horizontal band defined by said minimum and maximum heights.

The present disclosure further concerns an apparatus adapted for providing information to a user observing a multi view content displayed on a screen according to the user's head position,
wherein it comprises at least one memory and at least one processing circuitry configured to:
- establish a positioning zone to observe the displayed multi view content;
- define a triggering area arranged, at least partially, within the positioning zone;
- when the user's head position is located within said triggering area, trigger one or more incentive effects to encourage the user to stay within the positioning zone.

The present disclosure also concerns an apparatus adapted for providing information to a user observing a multi view content displayed on a screen according to the user's head position, wherein it comprises:
- a means for generating a positioning zone to observe the displayed multi view content;
- a means for defining a triggering area arranged, at least partially, within the positioning zone;
- when the user's head position is located within said triggering area, a means for triggering one or more incentive effects to encourage the user to stay within the positioning zone.

In an embodiment, the positioning zone and the triggering area can have both a pyramidal shape.

In an embodiment, the one or more incentive effects can comprise at least one of:
- a darkening effect to darken the display screen depending on the user's head position within said triggering area,
- a parallax intensity effect to adapt an intensity of a parallax effect associated with a user's head movement within the triggering area;
- one or more visual cues indicating a direction on the display screen.

In an embodiment, the darkening effect can allow to increase the brightness of the display screen when the angle of view associated with the user's head position located within the triggering area increases, and conversely.

In an embodiment, the parallax intensity effect can decrease the speed of movement of elements appearing in the multi view content displayed on the screen, when the angle of view associated with the user's head position located within the triggering area increases.

In an embodiment, the one or more incentive effects can be reversible.

In an embodiment, the apparatus can be configured to display the positioning zone and/or the triggering area.

Besides, the present disclosure is further directed to a non-transitory program storage device, readable by a computer, tangibly embodying a program of instructions executable by the computer to perform a method configured to be associated with the display of a multi view content on a display screen depending on a position of a user's head, wherein said method comprises:
- generating a positioning zone to observe the displayed multi view content;
- defining a triggering area arranged, at least partially, within the positioning zone;
- when the user's head position is located within said triggering area, triggering one or more incentive effects to encourage the user to stay within the positioning zone.

The present disclosure also concerns a computer program product which is stored on a non-transitory computer readable medium and comprises program code instructions executable by a processor for implementing a method configured to be associated with the display of a multi view content on a display screen depending on a position of a user's head,
wherein said method comprises:
- generating a positioning zone to observe the displayed multi view content;
- defining a triggering area arranged, at least partially, within the positioning zone;
- when the user's head position is located within said triggering area, triggering one or more incentive effects to encourage the user to stay within the positioning zone.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the method as previously described.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiments and execution examples, in no way limitative, with reference to the appended figures on which:

FIGS. 2A to 2D show four projections of a multi view content displayed by the rendering system of FIG. 1A depending on the user's head position according to some embodiments;

Wherever possible, the same reference numerals will be used throughout the figures to refer to the same or like parts.

DETAILED DESCRIPTION

Figure 1A:
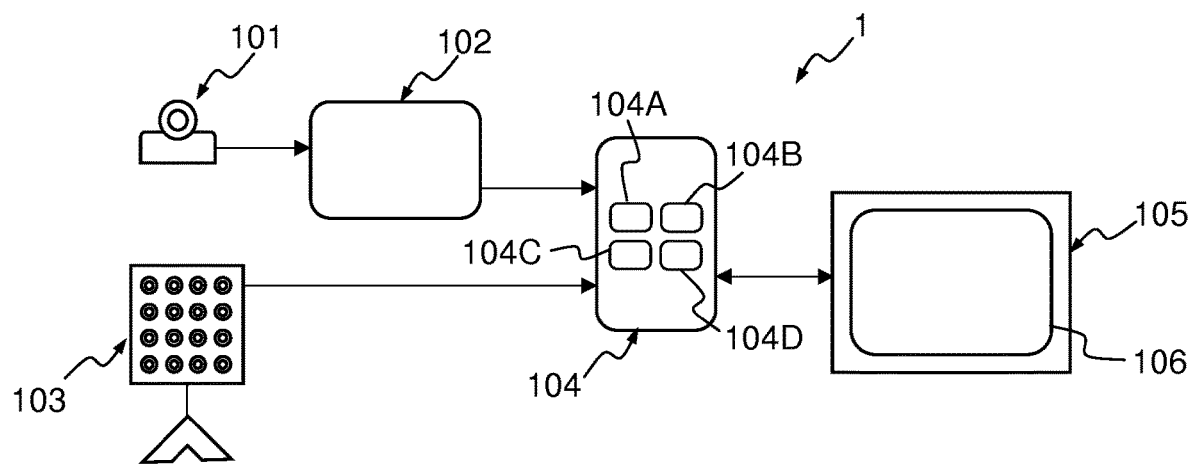
FIG. 1A is a schematic diagram of an exemplary rendering system used in which one or more embodiments of the disclosure may be implemented.

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

FIG. 1A shows a schematic diagram of an exemplary rendering system used in which one or more embodiments of the disclosure may be implemented.

The rendering system 1 comprises a capturing device 101, a processing apparatus 102, an acquisition device 103, an image projection computing apparatus 104 and a display device 105 equipped with a display screen 106.

It should be appreciated that the image projection computing apparatus 104 and the display device 105 can be combined together to form a standalone device, while they have been represented separately in FIG. 1A. Similarly, the processing apparatus can be integrated with the image projection computing apparatus.

The capturing device 101 can be formed by a webcam, a video camera, or the like, configured to shoot the face of a user in front of the capturing device 101. The capturing device 101 can be arranged in communication with the processing apparatus 102.

The processing apparatus 102 is configured to receive multimedia content (such as a video) captured by the capturing device 101. From the received content, the processing apparatus 102 can determine the position of the user's head with respect to the display screen 106 and can further track movements of the user's head thanks to known tracking algorithms.

The acquisition device 103 is configured to acquire a multi view content (corresponding to a scene 200), such as a multi view still image or a multi view video. As an illustrative, but non-limitative example, the acquisition device can be formed by a fixed camera array composed of a plurality of distinct cameras regularly arranged or by a plenoptic camera comprising an array of micro-lenses positioned in front of an image sensor. In a variant or complement compliant with the present principles, the acquisition device can be a virtual acquisition device (e.g. a virtual camera array) to obtain computer-generated imagery (CGI). For each acquired multi view image or each frame of a multi view video, the acquisition device 103 can provide a set of multi-views, a set of depth maps and associated system acquisition parameters.

The image projection computing apparatus 104 can receive both data associated with user's head position and movements from the processing apparatus 102 and the acquired multi view content (image or video) delivered by the acquisition device 103. Based on the received information, the image projection computing apparatus 104 is configured to determine a projection of the multi view content to be displayed on the display device 105 as a function of the position of the user's head.

The projection of the acquired multi view content (set of different images associated with depth maps) on the screen 106 is the result of:
- an un-projection of the original multi view content (so called Multi View data or MVD) to obtain a 3D representation of the scene 200 captured by the acquisition device 103;
- a transformation H for adapting the scene for a proper visualization;
- a re-projection of the 3D data to obtain the image viewed from the user's position on the screen 106.

When the acquisition device 103 is a camera array, the two following matrices are estimated by calibration for each camera:
- a projection matrix $K_c$ (also called intrinsics matrix) defined as:

$$K_c = \begin{bmatrix} f_u & 0 & c_u & 0 \\ 0 & f_v & c_v & 0 \\ 0 & 0 & 0 & 1 \\ 0 & 0 & 1 & 0 \end{bmatrix}$$

wherein:
- $f_u$ and $f_v$ are the focal length of the considered camera of the acquisition device 103 in horizontal direction and vertical direction respectively (units are pixels);
- $c_u$ and $c_v$ are the horizontal and vertical coordinates of the intersection of the optical axis with the sensor of the camera (units are pixels);
- a pose matrix $P_c$ (also called extrinsics matrix) is defined as:

$$P_c = \begin{bmatrix} r_{11} & r_{12} & r_{13} & T_x \\ r_{21} & r_{22} & r_{13} & T_y \\ r_{21} & r_{32} & r_{33} & T_z \\ 0 & 0 & 0 & 1 \end{bmatrix}$$

wherein:
- $r_{11}$ to $r_{33}$ elements form a 3D rotation matrix describing the rotation of the considered camera with respect to the 3D world coordinate system. For convenience reason, the 3D world coordinate system is assumed to be arranged at the center of the acquisition device 103,
- $T_x$, $T_y$ and $T_z$ are components of the translation of the considered camera with respect to the 3D world coordinate system (units are meters).

Considering a pixel (u, v) of the sensor of a camera of the acquisition device 103, its color (referenced RGB) and depth (referenced z(u, v, c)) are available (image and associated depth map). The pixel (u, v) can be un-projected in the 3D world coordinate system by using the following equation:

$$\begin{bmatrix} X \\ Y \\ Z \\ 1 \end{bmatrix} = z_{uv} * P_c * K_c^{-1} * \begin{bmatrix} u \\ v \\ 1/z_{uv} \\ 1 \end{bmatrix} = \begin{bmatrix} T_x + z_{uv}\left(r_{11}\frac{u-c_u}{f_u} + r_{12}\frac{v-c_v}{f_v} + r_{13}\right) \\ T_y + z_{uv}\left(r_{21}\frac{u-c_u}{f_u} + r_{22}\frac{v-c_v}{f_v} + r_{23}\right) \\ T_z + z_{uv}\left(r_{31}\frac{u-c_u}{f_u} + r_{32}\frac{v-c_v}{f_v} + r_{33}\right) \\ 1 \end{bmatrix}$$

wherein $z_{uv}$ is the depth of the pixel at position (u,v) in the image. For natural images, this depth has been estimated with known algorithms.

Figure 1B:
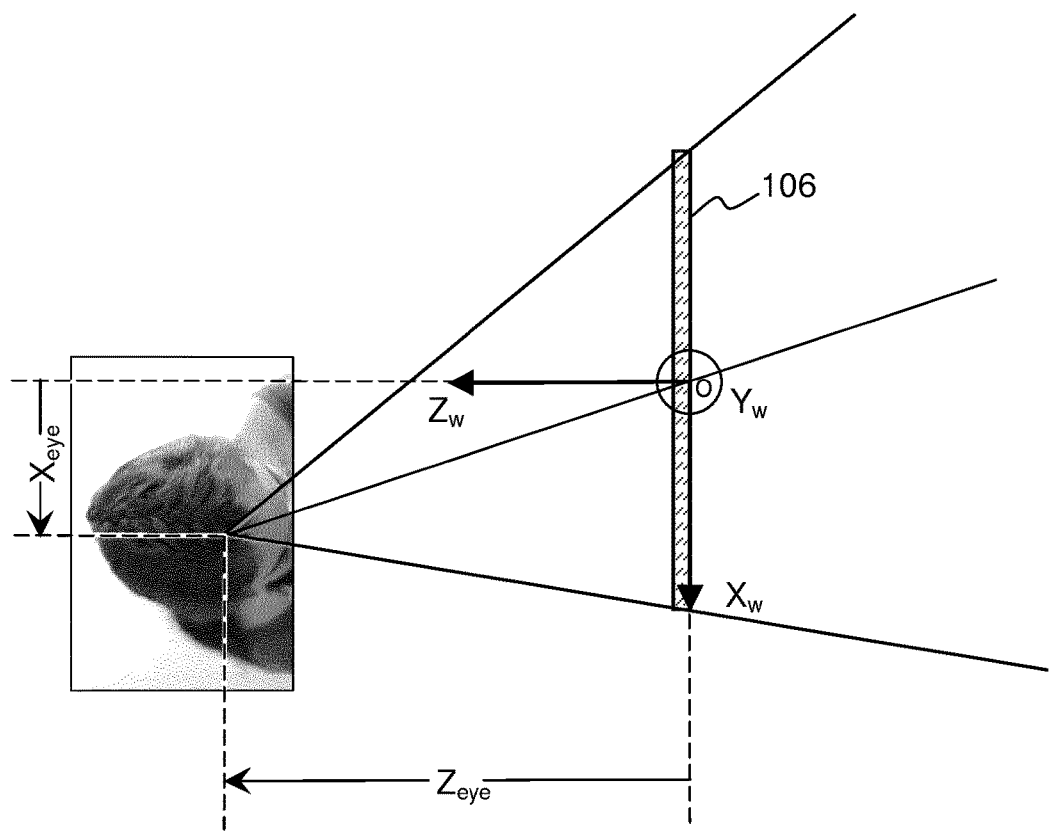
FIG. 1B shows the coordinates system used for OpenGL representation.

In the following, the 3D visualization coordinate system (CS) associated with screen 106 is considered as the reference one (identified by ($X_w$, $Y_w$, $Z_w$) in FIG. 1B) arranged at center O of the screen 106 and whose dimensions are normalized with W_screen/2 or H_screen/2 (x and y dimensions are transformed in the range [−1; +1]).

For the re-projection, the following OpenGL matrix of projection can be used:

$$K_{eye} = \begin{bmatrix} \frac{Z_{eye}}{W_{screen}/2} & 0 & -\frac{X_{eye}}{W_{screen}/2} & 0 \\ 0 & \frac{Z_{eye}}{H_{screen}/2} & -\frac{Y_{eye}}{H_{screen}/2} & 0 \\ 0 & 0 & -\frac{Z_{far}+Z_{near}}{Z_{far}-Z_{near}} & 2\frac{Z_{far}Z_{near}}{Z_{far}-Z_{near}} \\ 0 & 0 & -1 & 0 \end{bmatrix}$$

wherein:
- $W_{screen}$ is the screen width and $H_{screen}$ the screen height;
- $(X_{eye}, Y_{eye}, Z_{eye})^T$ represents the position of the user in this 3D visualization CS;
- $Z_{near}$ is the distance along the z axis between the eye position and a plane ($z=z_{near}$) below which points in the scene are discarded (not shown in FIG. 1B);
- $Z_{far}$ is the distance along the z axis between the eye position and a plane ($z=z_{far}$) behind which points in the scene are discarded (not shown in FIG. 1B).

Such OpenGL matrix is described for example in the document *"OpenGL Programming Guide 9th edition, Appendix E"*, by Dave Shreiner, Graham Sellers, John Kessenich—The Khronos OpenGL ARB Working Group—Addison Wesley editor.

A virtual camera (arranged at the user's head position) needs to be placed also in that 3D visualization CS. The following translation matrix $T_{eye}$ (representing the movement of the user's head with respect to the screen 106) is used to compute the image viewed by the user on the screen 106:

$$T_{eye} = \begin{bmatrix} 1 & 0 & 0 & \frac{X_{eye}}{W_{screen}/2} \\ 0 & 1 & 0 & \frac{Y_{eye}}{H_{screen}/2} \\ 0 & 0 & 0 & -\frac{Z_{eye}}{W_{screen}} \\ 0 & 0 & 0 & 0 \end{bmatrix}$$

A 3D point is further transformed thanks to following equation:

$$\begin{bmatrix} u' \\ v' \\ B + AZ_{eye} \\ -Z_{eye} \end{bmatrix} = K_{eye} * T_{eye} * \begin{bmatrix} X \\ Y \\ Z \\ 1 \end{bmatrix}$$

and then projected into the displayed image by making the 4D vector homogeneous:

$$\begin{bmatrix} u \\ v \\ Z' \\ 1 \end{bmatrix}_{eye} = -1 / Z_{eye} \begin{bmatrix} u' \\ v' \\ B + AZ_{eye} \\ -Z_{eye} \end{bmatrix} = \begin{bmatrix} -u'/Z_{eye} \\ -v'/Z_{eye} \\ A - B/Z_{eye} \\ 1 \end{bmatrix}$$

wherein $z_{eye}$ defines the Z of the 3D point viewed in a virtual camera coordinate system (attached to the user's head) while Z' is the depth stored in the Z buffer of the displayed image computation.

It should be noted that the minus sign relies on the fact that, in OpenGL representation, the Z axis is oriented towards the eye so that all 3D points have negative Z value. The $z_{eye}$ value is consistent with a metric value, while $Z'_{eye} = A - B/Z_{eye}$ is a function of Z with a format convenient for the Z buffer algorithm.

To project a pixel in the MVD format on the screen 106 observed by the user, the following equation is considered:

$$\begin{bmatrix} u \\ v \\ Z' \\ 1 \end{bmatrix}_{eye} = -\frac{1}{Z_{eye}} * K_{eye} * T_{eye} * H * P_c * z_{uv} * K_c^{-1} * \begin{bmatrix} u \\ v \\ 1 \\ \frac{1}{z_{(u,v)}} \\ 1 \end{bmatrix}_c$$

Thus, thanks to the rendering system 1, the closer to the screen 106 the user's head is, the more he sees a large portion of the acquired scene 200. The more he moves away from the screen 106, the more he sees a sub-part of it.

The display device 105 can be any kind of device equipped with a screen, such as a TV set, a tablet, a smartphone, a laptop, a PDA, a head-mounted device, or the like.

As illustrated in FIGS. 2A to 2D, the rendering system 1 can display on the screen 106 a projection of the obtained multi view content which depends on the user's head position. The displayed projection depends on the user's head position and the rendering system 1 is adapted to adjust the displayed projection according the user's head movements. FIGS. 2A to 2D show four examples of projection 210A to 210D of a multi view content of a same acquired scene 200 associated with four different position of the user's head with respect to the display screen 106. The projection displayed on the screen 106 corresponds to the scene 200 observed by the user through a window.

Thus, the rendering system 1 is configured to provide a parallax effect depending on the user's head position in front of the display device 105, when displaying the multi view content on the screen 106. In particular, the parallax effect can be defined by the relative positions of several objects (elements) of the scene 200, these positions being observed by the user. The more the difference of depth between objects is, the more the observed relative position will be modified.

Figure 3A:
FIGS. 3A and 3B show black bands appearing on the display screen of the rendering system when the user has reached the limits of the displayed multi view content.
Figure 3B:
Figure 4:
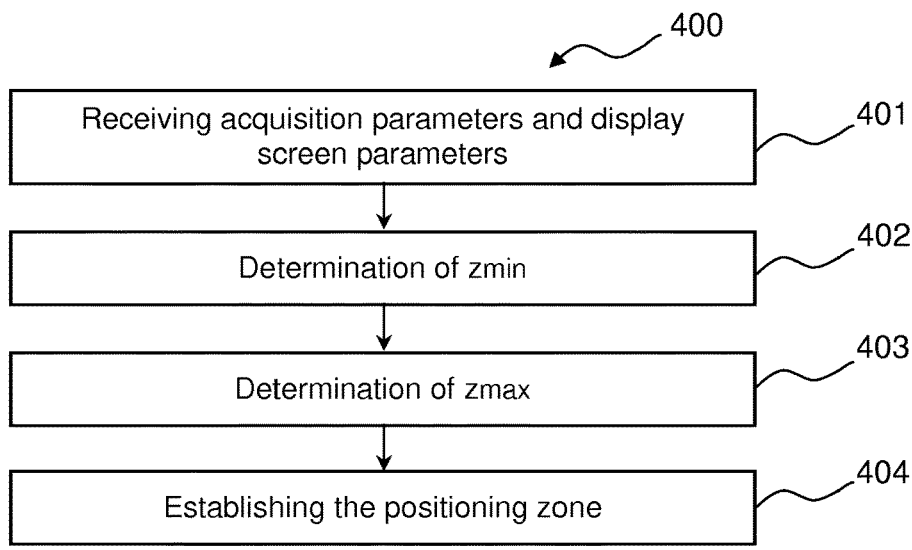
FIG. 4 is flow chart of an exemplary method used by some embodiments of the disclosure to generate a positioning zone.

To prevent the user from reaching the limits of the displayed multi view content (e.g. leading to the display of black bands 300 on the edges of the display screen as shown in FIGS. 3A and 3B), the present disclosure proposes a method 400 (shown in FIG. 4) for generating a positioning zone 500 (so called comfort zone, shown in FIGS. 5 and 6) to observe, on the display screen 106, a multi view content acquired by the rendering system 1.

In the following, the method 400 is operated by the image projection computing apparatus 104. Naturally, in a variant or complement, said method 400 can be implemented by another element of the rendering system 1, such as the display device 105 or a standalone element (not shown in the Figures).

Figure 5:
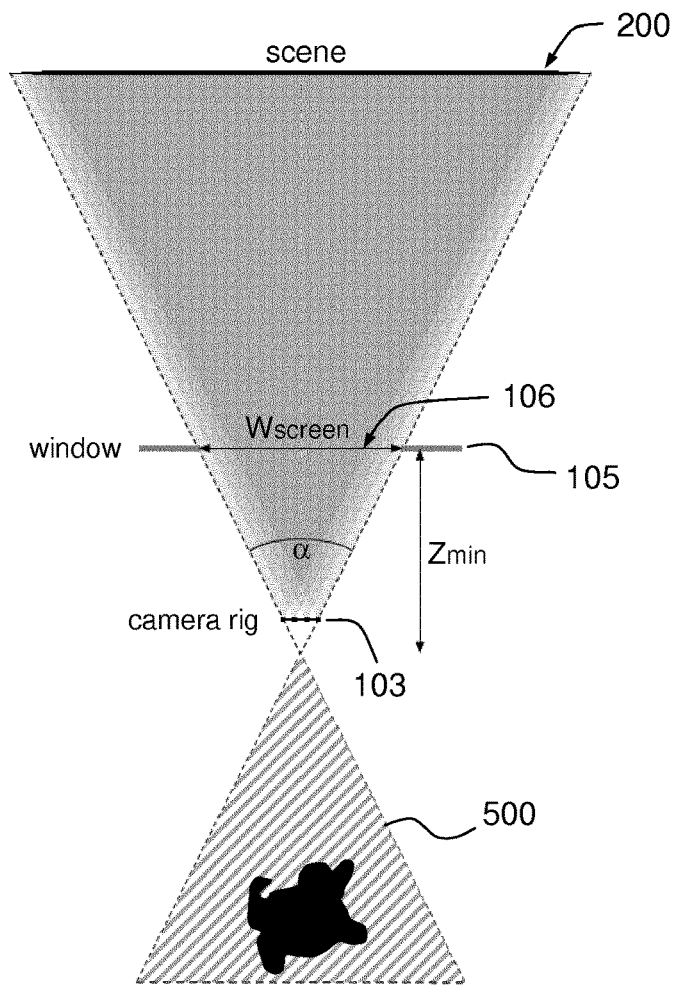
FIGS. 5 and 6 depicts the positioning zone obtained from the implementation of the method of FIG. 4, respectively in an horizontal plane and a vertical plane.
Figure 6:
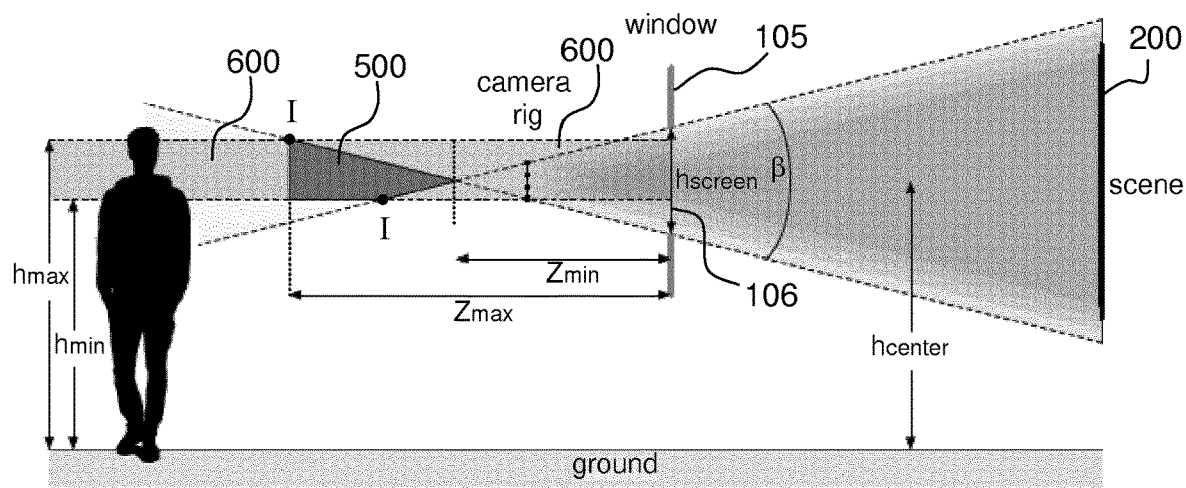

In an embodiment, as shown in FIGS. 5 and 6, the positioning zone 500 can have a pyramidal shape, for instance centered with respect to the display screen 106.

In an embodiment, the method 400 comprises, in step 401, the reception, by the image projection computing apparatus 104, of acquisition parameters of the acquisition device 103 and parameters of the display screen 106.

The acquisition parameters can comprise the horizontal angle of view α and the vertical angle of view β of the acquisition device 103, as shown in FIGS. 5 and 6. The parameters of the display device 105 can further comprise the height $h_{screen}$ and width $w_{screen}$ of the display screen 106.

The method 400 further comprises, in step 402, the determination of a minimum distance from the display screen to define the positioning zone 500, for instance by a dedicated means 104A of the image projection computing apparatus 104.

In an embodiment, when the aspect ratio (relationship between width and height) of the multi view content captured by the acquisition device 103 differs from the aspect ratio associated with the display screen 106, the minimum distance $z_{min}$ corresponds to the maximum between:

an horizontal minimum distance obtained from the width $w_{screen}$ of the display screen and the horizontal angle of view α of the acquisition device 103, thanks to, for instance, the following equation:

$$z_{min} = \frac{w_{screen}}{2 \tan^{-1}\left(\frac{\alpha}{2}\right)}$$

a vertical minimum distance obtained from the height $h_{screen}$ of the display screen and the vertical angle of view β of the acquisition device 103, thanks to, for instance, the following equation:

$$z_{min} = \frac{h_{screen}}{2\tan^{-1}\left(\frac{\beta}{2}\right)}$$

In a variant, when the aspect ratio of the multi view content captured by the acquisition device 103 is the same than the one of the display screen 106, the minimum distance $z_{min}$ corresponds to the horizontal minimum distance above mentioned, which is equal to the vertical minimum distance.

Thus, the top of the pyramidal shape of the positioning zone 500 is arranged at the minimum distance $z_{min}$ and centered with respected to the display screen 106.

As shown in FIGS. 5 and 6, the pyramidal shape of the positioning zone 500 is defined by the horizontal angle of view α and the vertical angle of view β of the acquisition device 103. The pyramidal shape can present a rectangular base.

In a variant or complement, the method 400 further can comprise, in step 403, the definition, by the means 104A, of a maximum distance $z_{max}$ from the display screen 106 obtained from a minimum height $h_{min}$ and a maximum height $h_{max}$ between which the user's gaze can be located, as shown in FIG. 6. Said maximum distance $z_{max}$ can depend on the user's height, his capabilities to move in the vertical direction and/or predetermined. The minimum height $h_{min}$ and maximum height $h_{max}$ can be determined by the image projection computing apparatus 104 based on a user input, for instance, through a user interface (not shown in the Figures) operated by either the image projection computing apparatus 104 or the display device 105. For example, $h_{min}$ and $h_{max}$ can correspond to the height of the user minus a given value and plus a given value respectively (said given value being positive or negative). In a variant, the user can also directly enter $h_{min}$ and $h_{max}$ in the rendering system through the user interface.

As depicted in FIG. 6, an horizontal band 600 arranged between $h_{min}$ and $h_{max}$ can be determined. The image projection computing apparatus 104 can further obtain the maximum distance $z_{max}$ from the intersection I of the pyramidal shape and the horizontal band 600. When there are two different intersections I (located at different distances), $z_{max}$ corresponds to the distance associated with the intersection I arranged the furthest from the display screen 106. The maximum distance $z_{max}$ corresponds to the distance from which the parallax effect starts to be attenuated for a constant amplitude of movement of the user's head position.

In an embodiment according to the disclosure, the generated positioning zone 500 to observe the multi view content can be displayed on the screen 106 for instance through the user interface.

Figure 7:
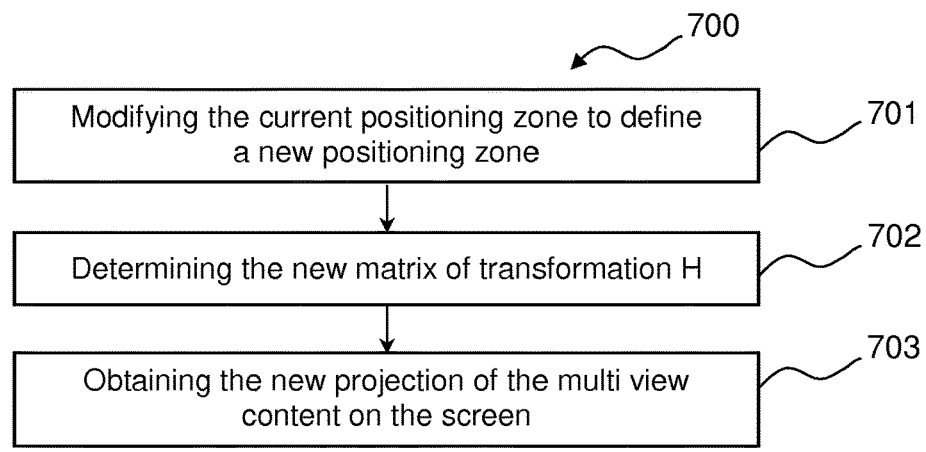
FIG. 7 depicts a flow chart of an exemplary method used by some embodiments of the disclosure to adapt the display of a multi view content by the rendering system of FIG. 1A, when a current positioning zone is modified.

In a further embodiment, as shown in FIG. 7, the disclosure also proposes a method 700 for adjusting a multi view content acquired by an acquisition device 103 and displayed on a screen 106 of a display device 105 to which a current positioning zone 500 has been obtained for example from the implementation of the method 400.

In particular, the method 700 can comprise, in a step 701, the modification of the current positioning zone 500, for instance upon user's input through a dedicated user interface (which can be the same as the one described with regards to method 400).

Figure 8A:
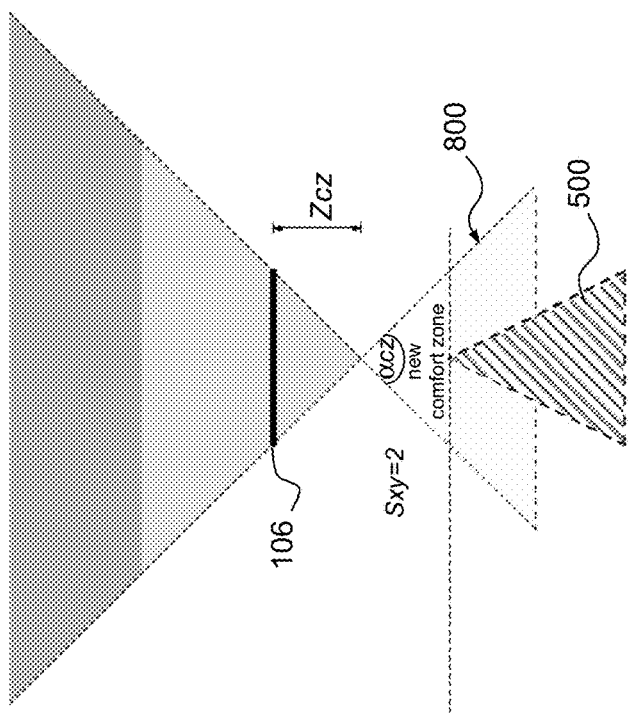
FIGS. 8A to 8C show some modifications (depth translation and scaling) applied on a current positioning zone according to some embodiments.
Figure 8B:
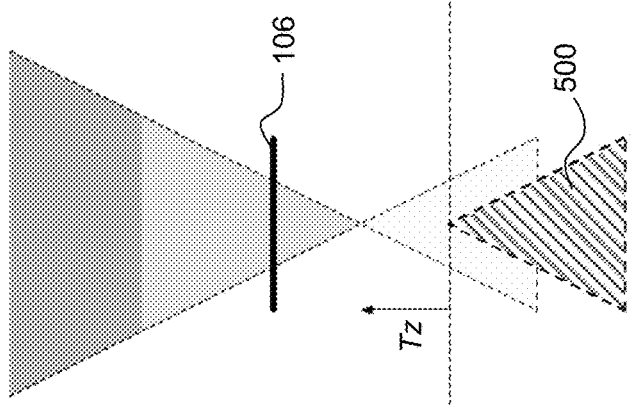
Figure 8C:
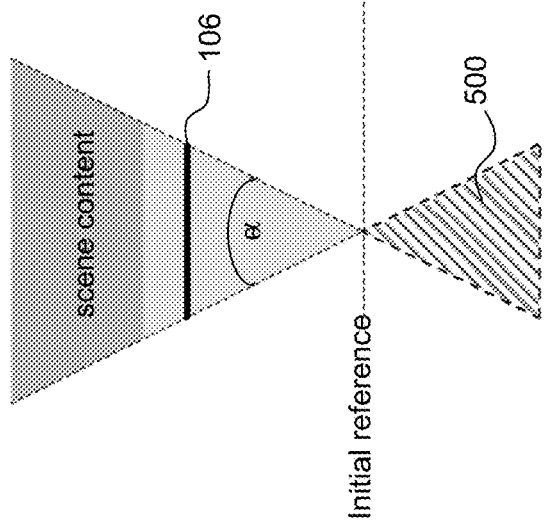

As illustrated in FIGS. 8A to 8C, the modification can comprise:
- a translation in the depth direction (z) with respect to the display screen 106 of the current positioning zone 500, and/or
- a uniform scaling in the horizontal and vertical directions (x, y), which correspond to a uniform scaling of the horizontal and vertical angles of view (α, β) defining the current positioning zone 500. The scaling is performed by considering the center of the screen 106. It should be noted that no scaling in the depth direction (z) is allowed on the current positioning zone.

The global modification (represented by the matrix of transformation H as previously defined) is defined, in a step 702, by:

$$H = S_{xy} * T_z = \begin{bmatrix} s & 0 & 0 & 0 \\ 0 & s & 0 & 0 \\ 0 & 0 & 1 & 0 \\ 0 & 0 & 0 & 1 \end{bmatrix} * \begin{bmatrix} 1 & 0 & 0 & 0 \\ 0 & 1 & 0 & 0 \\ 0 & 0 & 1 & t_z \\ 0 & 0 & 0 & 1 \end{bmatrix}$$

with $s = s_x = s_y$ and $s_z = 1$ wherein $S_{xy}$ is the scaling matrix and $T_z$ is the translation matric in depth.

As shown in the FIGS. 8A to 8C, the translation in depth and the uniform scaling leads to the generation of a new positioning zone 800 defined by a new minimum distance $z_{cz}$ and new angles of view $α_{cz}$ and $β_{cz}$ as follows:

$$z_{cz} = z_{min} + |T_z|$$

$$α_{cz} = α \times s_{xy}$$

By considering the above described equation for obtaining the projection of the multi view content on the screen 106 in function of the user's head position:

$$\begin{bmatrix} u \\ v \\ Z' \\ 1 \end{bmatrix}_{eye} = -\frac{1}{Z_{eye}} * K_{eye} * T_{eye} * H * P_c * z_{uv} * K_c^{-1} * \begin{bmatrix} u \\ v \\ 1 \\ z_{(u,v)} \\ 1 \end{bmatrix}_c$$

with the new transformation matrix H, the image projection computing apparatus 104 adapts, in step 703, the projection of the displayed multi view content to the definition of the new positioning zone 800.

Thus, when the new positioning zone 800 has been expanded by the user for instance thanks to the user interface, the displayed multi view content is adapted (for example by an adaptation means 104B of the computing apparatus 104) so that the user can move in the new positioning zone without reaching the limits (such as black bands or occulted areas) of the display of multi view content.

It should be appreciated that a front translation (i.e. when the positioning zone is moved towards the screen as shown in FIGS. 8A to 8C, $T_z < z_{min}$) can lead to increase the current positioning zone.

In an illustrative but non limitative example, the set of dual arrows (not shown) can be either displayed on the screen 106 for selection by the user directly by touching the arrows when the screen is a touch screen or through a keyboard or dedicated remote control.

Figure 9:
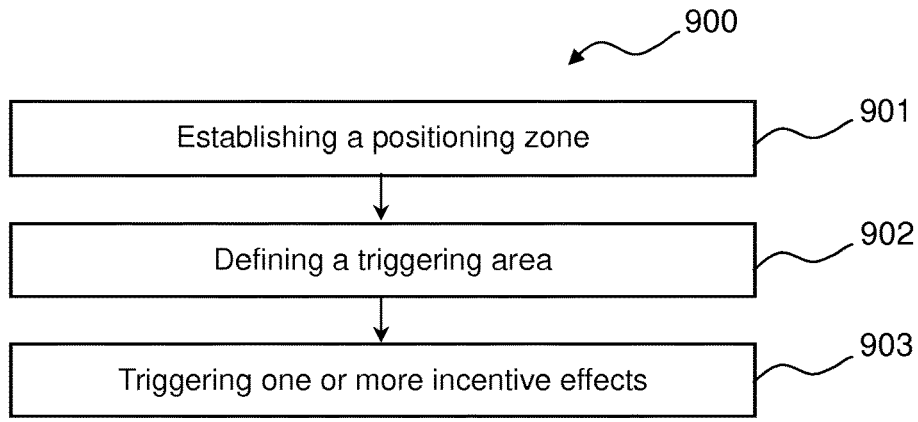
FIG. 9 is flow chart of an exemplary method used by some embodiments of the disclosure to encourage a user observing a multi view content displayed by the rendering device of FIG. 1 to stay in a positioning zone.

In a further embodiment shown in FIG. 9, the disclosure also proposes a method 900 for informing a user observing a multi view content on a screen 106 that he is close to reach and/or he is moving towards the boundaries of the corresponding positioning zone 500. Said method 900 can further be implemented by the image projection computing apparatus 104.

To that end, the method 900 comprises, in a step 901, the generation of a positioning zone 500 to observe the multi view content (for instance by the means 104A of the computing apparatus 104), according to the method 400 as previously described.

In a step 902, the method 900 further comprises the definition (e.g. by a module 104C of the computing apparatus 104) of a triggering area 550 arranged, at least partially, within the positioning zone 500. In a variant, the triggering area can be arranged outside the positioning zone 500, for instance contiguous to the positioning zone 500.

Figure 10:
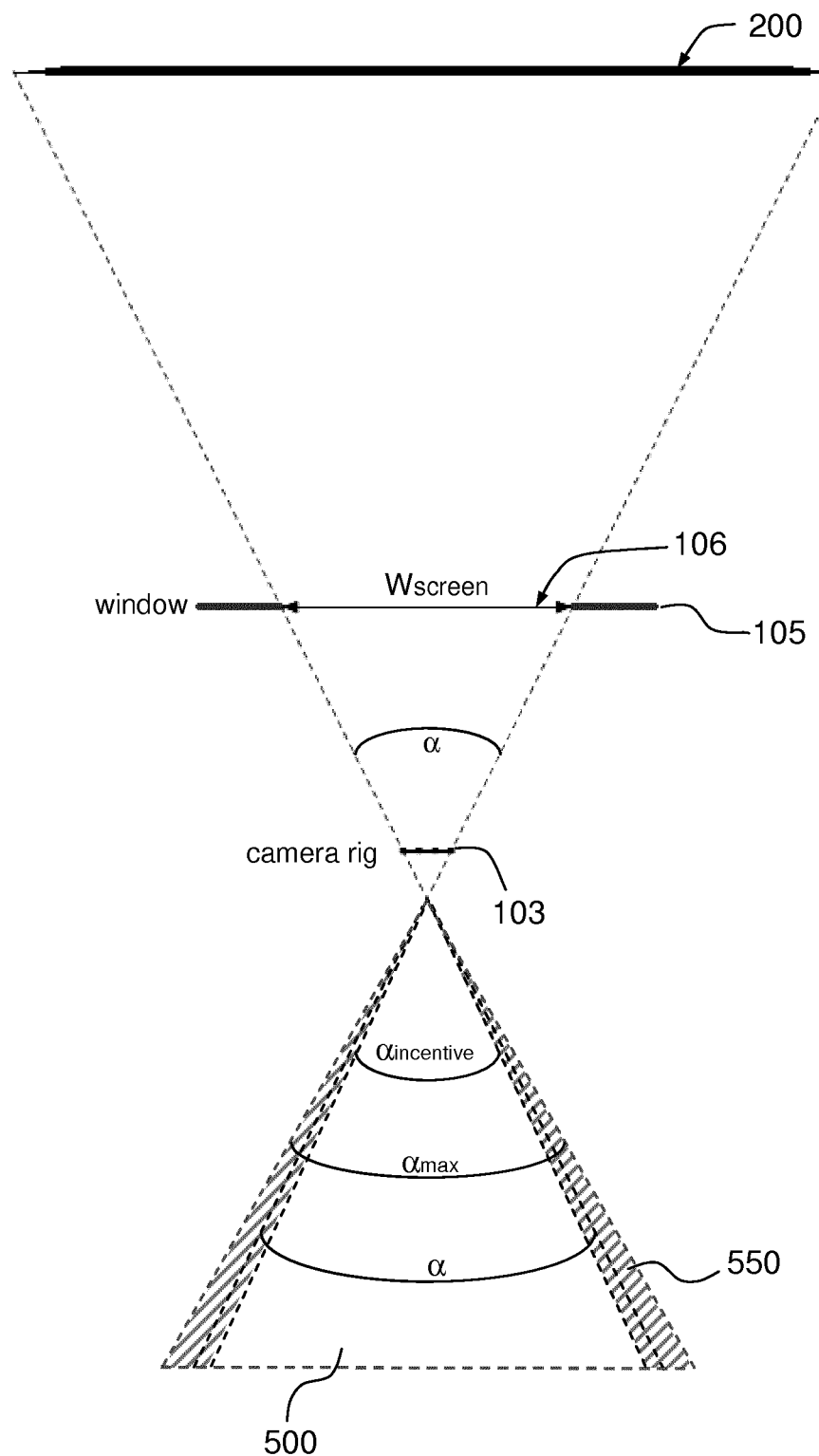
FIG. 10 shows an example of an exemplary triggering area associated with a positioning zone.

As shown in FIG. 10, the triggering area 550 can have a pyramidal shape defined:
- in an horizontal plane, by an incentive angle of view $\alpha_{incentive}$ defining a border of the triggering area 550 arranged within the positioning zone 500 and by a maximum horizontal angle of view $\alpha_{max}$ defining another border of said triggering area 550 located outside the positioning zone 500. In a variant or complement, $\alpha_{max}$ can correspond to the horizontal angle of view $\alpha$ defining the positioning zone 500. In a further variant or complement, $\alpha_{incentive}$ and $\alpha_{max}$ can be arranged within the positioning zone 500;
- in a vertical plane, by an incentive angle of view $\beta_{incentive}$ (not shown in the Figures) defining a border of the triggering area 550 arranged within the positioning zone 500 and by a maximum vertical angle of view $\beta_{max}$ defining another border of said triggering area 550 located outside the positioning zone 500. In a variant or complement, $\beta_{max}$ can correspond to the vertical angle of view $\beta$ defining the positioning zone 500. In a further variant or complement, $\beta_{incentive}$ and $\beta_{max}$ can be arranged within the positioning zone 500;

When the user's head position is located within said triggering area 550, the method 900 further comprises, in a step 903, the triggering of one or more incentive effects to encourage the user to stay within the positioning zone 500. The step 903 can be implemented by a triggering means 104D of the image projection computing apparatus 104.

In an embodiment, an incentive effect can be at least one of:
- a darkening effect to darken the display screen 106 when the user's head is moving towards a boundary of the positioning zone 500, and conversely. The darkening effect depends on the user's head position within the triggering area 550,
- a parallax intensity effect to adapt an intensity of a parallax effect associated with a user's head movement within the triggering area 550,
- one or more visual cues indicating a direction on the display screen 106.

Naturally, one or more incentive effects can be triggered concurrently by the computing apparatus 104.

In particular, the darkening effect can increase (e.g. the brightness of the screen 106 decreases, the screen 106 becomes darker) when the angle of view (horizontal or vertical) associated with the user's head position located within the triggering area 550 increases, and conversely. When the angle of view of the user's head position reaches one maximum angle (amongst the horizontal angle $\alpha_{max}$ and/or vertical angle $\beta_{max}$), the screen 106 becomes completely dark or black. It should be appreciated that the darkening effect decreases (i.e. the brightness of the screen 106 increases, the screen 106 becomes brighter) when the user's head moves away from a border of the triggering area 550 towards the center of the positioning zone 500.

In addition, while the darkening effect has been described as applied on the screen 106, it can be also applied, in a variant or complement, directly to the multimedia content itself (without modifying the brightness of the screen 106).

Figure 11:
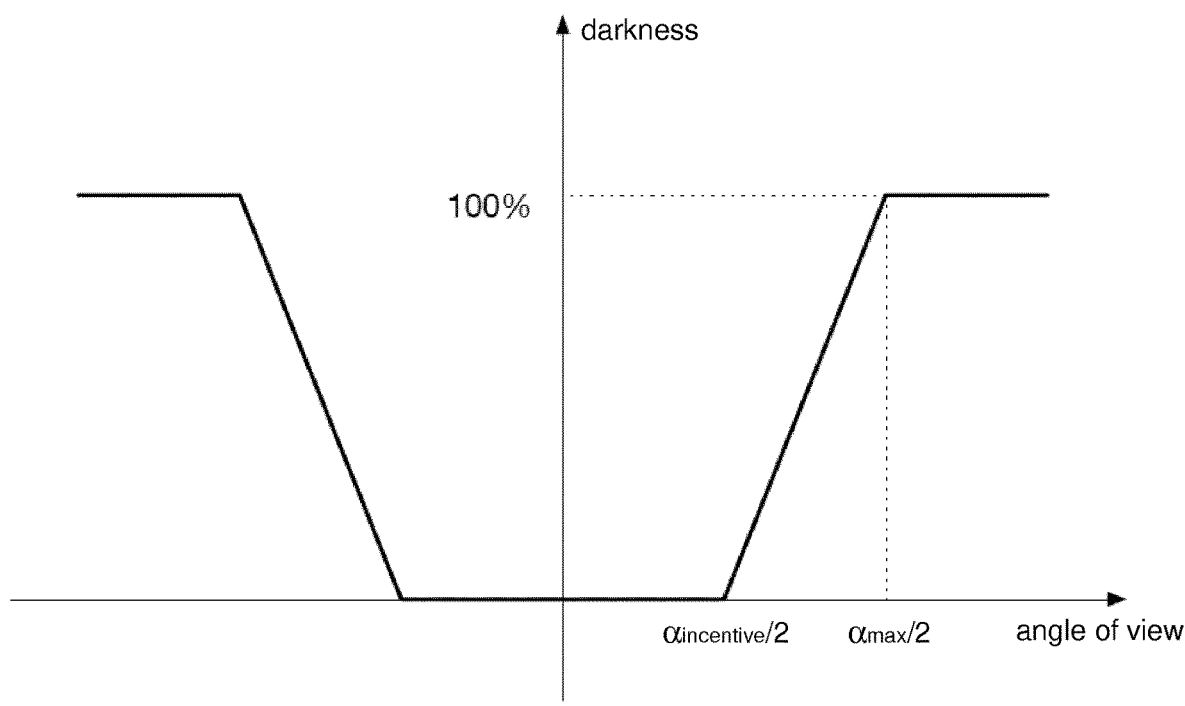
FIG. 11 depicts an exemplary curve showing the relationship between the angle of view of the user's head and the darkness of the display screen of the rendering system of FIG. 1.

As depicted by the curve of FIG. 11, the intensity of the darkening effect can be proportional to the angle of view associated with the user's head. Naturally, other kinds of relationship between the intensity of the darkening effect and the angle of view of the user's head might be used without departing from the disclosure.

Besides, the parallax intensity effect allows a modification of the speed of movement of elements appearing in the multi view content displayed on the screen 106, when the angle of view associated with the user's head position located within the triggering area 550 increases, and conversely.

Figure 12:
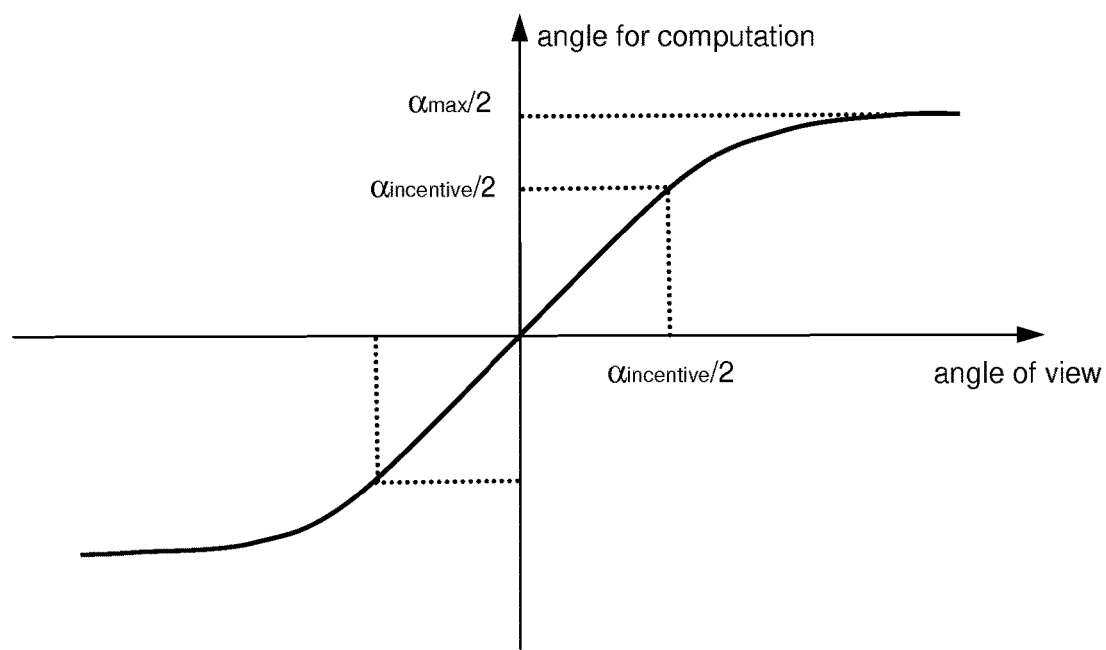
FIG. 12 shows an exemplary curve linking a computation angle with the angle of view associated with the user's head position.

To that end, in an embodiment, the image projection computing apparatus 104 can use a computation angle associated with the angle of view of the user's head. Said computation angle can be obtained from the relationship defined, for instance, by the exemplary curve shown in FIG. 12. Instead of computing the projection of the multimedia content to be displayed on the screen 106 based on the angle of view of the user's head, the computing apparatus 104 can determine the projection associated with said angle of view of the user's head by using the corresponding computation angle.

Thus, the parallax effect perceived by the user corresponds to the parallax effect which can be observed at an angle different from the angle of view associated with the user position, so that the parallax effect seems to be attenuated to the user observing the screen 106.

In an embodiment, when the visual cue (for instance arrows) is implemented, one or more arrows can be displayed when the angle of view associated with user's head is arranged between $\alpha_{incentive}$ and $\alpha_{max}$, and/or $\beta_{incentive}$ and $\beta_{max}$. The arrows can be oriented towards the center of the positioning zone 500 to encourage the user to move away from the borders of the later. Once the user's head is in the positioning zone 500, but not in the triggering area 550 anymore, the arrows can disappear. In a further complement, the arrows can blink to draw user's attention. The blinking rate can depend on the position of the user's head within the triggering area (such as the closer to outside borders of the triggering area the user's head is, the higher the blinking rate will be).

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method comprising:
defining a triggering area, the triggering area having a border with the border being arranged, at least partially, within a positioning zone for observing a multi view content displayed on a display screen based on a position of a viewer; and
when the viewer position is located within the triggering area, triggering one or more incentive effects, applied to the displayed multi view content.

2. The method according to claim 1, wherein the positioning zone and the triggering area both have a pyramidal shape.

3. The method according to claim 1, wherein the one or more incentive effects comprise one or more visual cues indicating a direction in the multi view content displayed on the display screen.

4. The method according to claim 1, wherein the multi view content having been acquired by an acquisition device, the positioning zone is established based on one or more obtained acquisition parameters of the acquisition device and one or more obtained parameters of the display screen.

5. The method of claim 1, wherein the multi view content is displayed with a parallax effect, the parallax effect generated based on a detected head position of the viewer.

6. The method of claim 1, wherein the one or more incentive effects comprise a darkening effect to darken the display screen depending on the viewer position within the triggering area.

7. The method according to claim 6, wherein the darkening effect decreases the brightness of the multi view content displayed on the display screen when an angle of view associated with the viewer position located within the triggering area increases, and conversely.

8. The method according to claim 7, wherein the darkening effect increases linearly with the angle of view of the viewer position.

9. The method of claim 1, wherein the one or more incentive effects change when an angle of view associated with the viewer position located within the triggering area changes.

10. The method according to claim 1, wherein the one or more incentive effects comprise a parallax intensity effect to adapt an intensity of a parallax effect associated with a viewer movement within the triggering area.

11. The method according to claim 10, wherein the parallax intensity effect decreases the speed of movement of elements appearing in the multi view content displayed on the display screen, when an angle of view associated with the viewer position located within the triggering area increases.

12. An apparatus, comprising:
a processor; and
a memory-storing device storing instructions operative, when executed by the processor, to cause the apparatus to:
define a triggering area, the triggering area having a border with the border being arranged, at least partially, within a positioning zone for observing a multi view content displayed on a display screen based on a position of a viewer; and
when the viewer position is located within the triggering area, trigger one or more incentive effects, applied to the displayed multi view content.

13. The apparatus according to claim 12, wherein the positioning zone and the triggering area both have a pyramidal shape.

14. The apparatus according to claim 12, wherein the one or more incentive effects comprise one or more visual cues indicating a direction in the multi view content displayed on the display screen.

15. The apparatus according to claim 12, wherein the instructions are operative to further cause the apparatus to display at least one of the positioning zone and the triggering area.

16. The apparatus according to claim 12, wherein the one or more incentive effects comprise a darkening effect to darken the display screen depending on the viewer position within the triggering area.

17. The apparatus according to claim 16, wherein the darkening effect decreases the brightness of the multi view content displayed on the display screen when an angle of view associated with the viewer position located within the triggering area increases, and conversely.

18. The apparatus according to claim 12, wherein the one or more incentive effects comprise a parallax intensity effect to adapt an intensity of a parallax effect associated with a viewer movement within the triggering area.

19. The apparatus according to claim 18, wherein the parallax intensity effect decreases the speed of movement of elements appearing in the multi view content displayed on the display screen, when an angle of view associated with the viewer position located within the triggering area increases.

20. A method comprising:
defining a triggering area, the triggering area having a border with the border being arranged, at least partially, within a positioning zone for observing a multi view content displayed on a display screen based on a position of a viewer; and when the viewer position is located within the triggering area, triggering one or more incentive effects, wherein the one or more incentive effects comprise a parallax intensity effect to adapt an intensity of a parallax effect associated with a viewer movement within the triggering area, and wherein the parallax intensity effect decreases the movement speed of elements appearing in the multi view content displayed on the screen when an angle of view associated with the viewer position located within the triggering area increases.

21. The method according to claim 20, wherein the one or more incentive effects comprise a darkening effect to darken the display screen depending on the viewer position within the triggering area, and wherein the darkening effect increases when an angle of view associated with the viewer position located within the triggering area increases.

22. An apparatus, comprising:
a processor; and
a memory-storing device storing instructions operative, when executed by the processor, to cause the apparatus to:
define a triggering area, the triggering area having a border with the border being arranged, at least partially, within a positioning zone for observing a multi view content displayed on a display screen based on a position of a viewer; and
when the viewer position is located within the triggering area, trigger one or more incentive effects, wherein the one or more incentive effects comprise a parallax intensity effect to adapt an intensity of a parallax effect associated with a viewer movement within the triggering area, and wherein the parallax intensity effect decreases the movement speed of elements appearing in the multi view content displayed on the screen when an angle of view associated with the viewer position located within the triggering area increases.

23. The method according to claim 22, wherein the one or more incentive effects comprise a darkening effect to darken the display screen depending on the viewer position within the triggering area, and wherein the darkening effect increases when an angle of view associated with the viewer position located within the triggering area increases.

24. A non-transitory computer-readable medium comprising instructions executable by at least one processor to perform a method, the method comprising:
defining a triggering area, the triggering area having a border with the border being arranged, at least partially, within a positioning zone for observing a multi view content displayed on a display screen based on a position of a viewer; and
when the viewer position is located within the triggering area, triggering one or more incentive effects, applied to the displayed multi view content.

* * * * *